July 28, 1959 W. S. SUTOWSKI 2,897,027
BEARING STRUCTURE
Filed Feb. 27, 1956
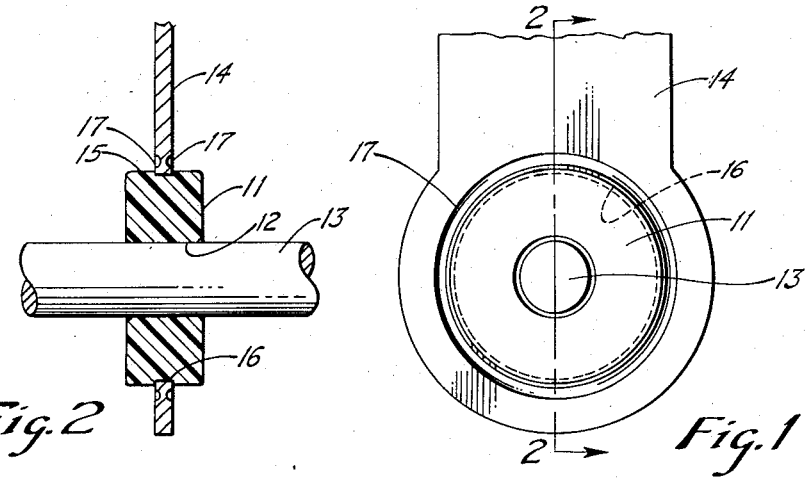
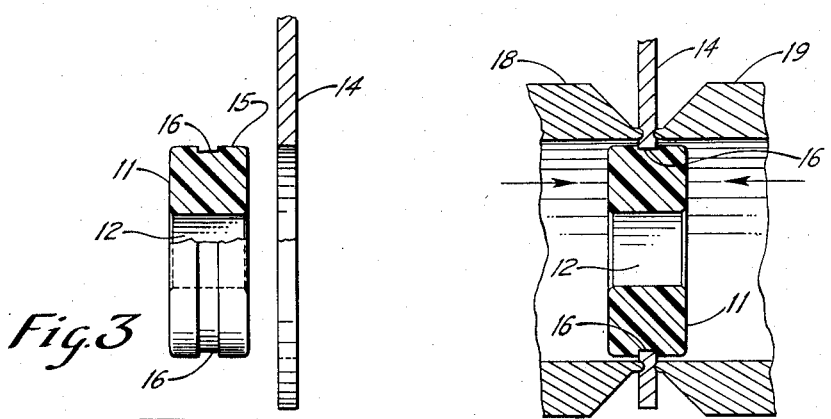
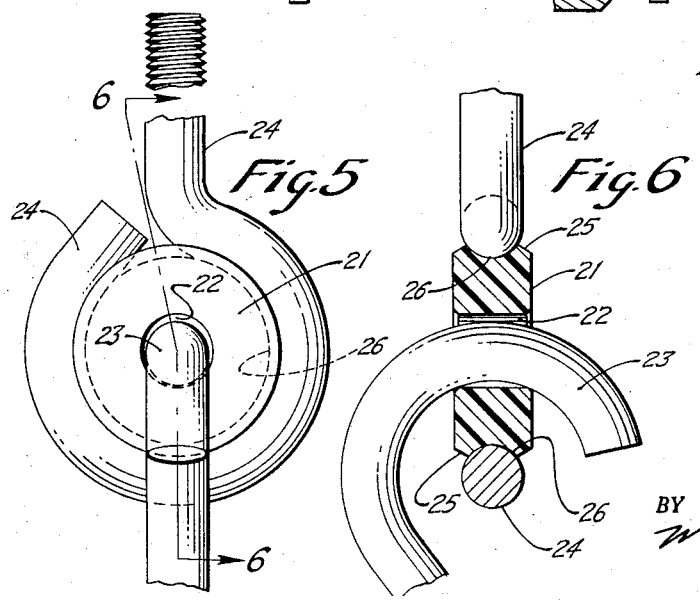
INVENTOR.
WALTER S. SUTOWSKI

United States Patent Office 2,897,027
Patented July 28, 1959

2,897,027

BEARING STRUCTURE

Walter S. Sutowski, Brecksville, Ohio

Application February 27, 1956, Serial No. 568,046

4 Claims. (Cl. 308—238)

My invention relates to bearing structures. In general, the subject of my invention is related to the subject matter of my prior U.S. Patent No. 2,625,449 which, however, does not disclose the novel structure herein described and claimed.

My bearing structure may be used in porch gliders or in other apparatus wherein the incorporation of a bearing structure of this general type is appropriate.

An object of my invention is to provide an improved bearing structure which is economical in construction and efficient in operation.

Another object is the provision of a device of this character having a minimum of parts and requiring a minimum of operations to make the same.

Another object is the provision of a bearing structure embodying and taking advantage of the peculiar characteristics of nylon as a bearing surface.

Another object is the provision of a bearing structure having a portion subject to the bearing motion secured to a supporting member to prevent axial and lateral movement of that portion relative to the supporting member.

Still another object is to provide a bearing unit which is sturdy in construction and which bears up under long continued use.

Another object is the provision of a novel combination of parts and material to provide a useful and important device not heretofore obtainable.

Other objects and a fuller understanding of my invention may be had by referring to the following description and claims, taken in conjunction with the accompanying drawing, in which:

Figure 1 is an elevated side view of a bearing structure embodying the preferred form of my invention;

Figure 2 is a longitudinal sectional view taken through the line 2—2 of Figure 1;

Figure 3 is an exploded view of the annular bearing portion of my device and the supporting portion prior to assembly;

Figure 4 is a view illustrating a step in the construction of the device shown in Figure 1;

Figure 5 is a side elevational view of a modified form of bearing structure embodying my invention; and Figure 6 is a sectional view taken through the line 6—6 of Figure 5.

My novel bearing structure incorporates an annular member 11 which is formed of a tube or block of nylon in solid form. The annular member 11 has a central opening 12 extending therethrough, through which a shaft or pivot member 13 extends. The shaft or pivot member 13 may rotate in the central opening 12 while the nylon annular member 11 is stationary, or by reverse movement, the shaft or pivot member 13 may be stationary while the annular member 11 revolves around the shaft or pivot member 13.

The nature of the nylon is such that the surface of the nylon where it engages the outer cylindrical surface of the shaft or pivot member 13 provides an excellent bearing surface in which friction loss is minimized. This bearing surface of the nylon is smooth and slippery and will adapt itself to the shaft or pivot member 13 accommodated in the central opening 12. The nylon is resiliently yieldable to a small extent so as to permit any small foreign particles to be imbedded in the nylon and thus to avoid frictional contact with the shaft or pivot member 13. At the same time, the nylon is strong and rigid enough to substantially maintain its shape to withstand a considerable direct radial thrust upon the annular member 11 by the shaft or pivot member 13.

The annular member 11 has an outer circumferential surface or wall 15. Intermediate the axial ends of the annular member 11, there is formed in the outer circumferential wall 15 a groove or channel 16, this groove or channel 16 extending circumferentially completely around the annular member 11. A supporting member 14 in the form of a flat metal strap or plate has a round opening formed therein which accommodates the annular member 11. The inner peripheral edge of the round opening in the strap or plate 14 extends radially inward to occupy the groove 16 and to tightly engage the bottom wall of the groove 16 and also the axially spaced end walls of the groove 16. Thus, the annular member 11 is embraced by the supporting strap or plate 14 and is under slight compression by the strap or plate 14 pressing radially inward upon the bottom or inner wall of the groove 16. The annular member 11 is held against axial movement relative to the strap or plate 14 by the interengagement of the strap or plate 14 with the axially spaced end walls of the groove 16.

Surrounding the annular member 11, there are two opposed circumferential depressions 17 in the metal strap or plate 14, these depressions being formed by peening tools which force the metal of the strap or plate 14 radially inward to occupy the groove 16.

In Figure 3, the plate or strap 14 is shown as having a round opening therein of a diameter substantially the same as the maximum diameter of the outer circumferential wall 15 of the annular member 11. The groove 16 is shown as extending around the annular member. In assembly, the annular member 11 of Figure 3 is moved axially into the round opening of the plate or strap 14 of Figure 3 so that the plate or strap 14 is in a plane coinciding with the plane of the groove 16. Thereafter, opposing peening tools 18 and 19 are forcibly brought together as illustrated in Figure 4 to peen the metal of the strap 14 around the annular member 11 to cause the metal to flow radially inward and to occupy the groove 16. This peening action causes the metal to engage the bottom and end walls of the groove 16 and at the same time to compress the slightly resilient yieldable nylon and to firmly anchor the annular member 11 to the strap 14. As thus seen, the annular member is anchored against both radial and axial movement relative to the supporting strap 14.

In Figures 5 and 6, the annular member is modified from that shown in the preceding views so as to accommodate other forms of support and pivot members.

In Figures 5 and 6, the annular member 21 also composed of solid nylon, has a central opening 22 extending therethrough. A hook or pivot member 23 extends through this central opening 22 and bearingly engages the nylon surface of the side of the central opening 22. The nylon accommodates itself by a slight yielding to the pivot member so that the lack of perfect eccentricity between the nylon of the annular member 21 and the curved hook or pivot member 23 may be readily accommodated.

The annular member 21 has an outer circumferential wall 25 in which a groove or channel 26 is formed, the groove 26 extending circumferentially around the annular member 21. The groove 26 has an annular wall, as shown in the drawing. Positioned in the groove 26 is the round eye portion of a threaded eye-bolt 24. The round portion of the eye-bolt 24 extends substantially around the annular member 21, as shown in the drawing, and complementarily engages the walls of the groove 26. The eye-bolt 24 is under such tension as to slightly compress the annular member 21 and to firmly embrace and hold the same. By reason of the interengagement of the eye-bolt 24 and annular member 21, the annular member 21 is firmly held against both radial and axial thrust relative to the eye-bolt 24.

Surprising and very useful results have been accomplished by the novel arrangement and combination here disclosed. The bearing structure here provided performs a uniquely useful service and in a most economical and yet efficient manner.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A bearing device comprising the combination of an annular member of nylon, said annular member having a round opening extending therethrough for receiving a pivot member, said opening having a cylindrical surface of nylon adapted to bearingly engage said pivot member to permit relative rotative movement therebetween, said annular member having an outer circumferential wall, said wall having a groove formed therein substantially equidistant the axial ends thereof and extending around the circumference of the annular member, and a supporting member having an open space therein, said supporting member in the plane of said groove embracing and radially compressing said annular member and being disposed in said groove, the interengagement of said supporting member and the side walls of said groove retaining the annular member against axial displacement relative to the supporting member.

2. A bearing device comprising the combination of an annular member of nylon, said annular member having a round opening extending therethrough adapted to receive a pivot member in bearing engagement with the nylon of said annular member for relative rotative movement between the pivot member and annular member, said annular member having in its outer wall a circular groove extending circumferentially around the annular member substantially equidistant the axial ends of the annular member, said groove having radially extending and opposing walls spaced apart axially of the annular member and a bottom wall disposed radially inward of said outer wall, and a metal supporting member having an open space therein, said supporting member around said open space having an inner peripheral wall and opposite side walls, said inner peripheral wall of the supporting member being in engagement with the bottom wall of said groove and said opposite side walls of the supporting member being in engagement with said opposing walls of the groove at substantially uniform distances from the axial ends of the annular member, said supporting member radially compressing said annular member to oppose the resiliency of the nylon and to maintain a firm engagement with said annular member in resistance to rotative thrust on said annular member by said pivot member.

3. A bearing device for accommodating a pivot member in rotative engagement therewith, comprising an annular member consisting of nylon formed with a central opening therethrough and having an outer circumferential wall spaced from said opening, said central opening having a cylindrical wall of smooth nylon for bearingly engaging with a pivot member concentrically disposed therein, said outer wall having a channel disposed therein and circumferentially extending around said annular member, and a metal member disposed in a plane normal to the axis of the annular member and embracing the annular member to resiliently and radially compress and tightly engage the same, said metal member having a portion disposed in said channel to interlock therewith, the resilient compression of said annular member retaining the bearing engagement of said cylindrical wall with said pivot member.

4. In combination, an annular bearing member of nylon having a central cylindrical opening adapted to accommodate an inner member and having an outer circumferential wall, said outer circumferential wall having axially spaced and radially extending shoulders extending circumferentially around said wall at substantially uniform distances from the axial ends of said bearing member, and an outer member extending circumferentially about said wall to tightly embrace and compress said annular bearing member about said cylindrical opening, said outer member having axially spaced wall portions disposed adjacent, and in axial alignment with, said spaced shoulders of the annular member to limit axial movement of the annular member relative to the outer member, said nylon providing a bearing surface for accommodating relative rotative movement between said outer member and a said inner member accommodated in said central opening, said outer member compressing said annular bearing member to maintain restraint upon the nylon surrounding said central opening.

References Cited in the file of this patent

UNITED STATES PATENTS

| 2,608,751 | Hutton | Sept. 2, 1952 |
| 2,625,449 | Sutowski | Jan. 13, 1953 |

OTHER REFERENCES

Modern Plastics, May 1948, page 7.